(12) United States Patent
Kikumoto et al.

(10) Patent No.: US 7,902,448 B2
(45) Date of Patent: Mar. 8, 2011

(54) POSITION SENSING DEVICE

(75) Inventors: Tadao Kikumoto, Hamamatsu (JP);
Mitsuhiro Umeta, Hamamatsu (JP)

(73) Assignee: Roland Corporation, Shizuoka-ken (JP)

( * ) Notice: Subject to any disclaimer, the term of this patent is extended or adjusted under 35 U.S.C. 154(b) by 64 days.

(21) Appl. No.: 12/329,532

(22) Filed: Dec. 5, 2008

(65) Prior Publication Data

US 2009/0151548 A1 Jun. 18, 2009

(30) Foreign Application Priority Data

Dec. 13, 2007 (JP) ................................ 2007-322092

(51) Int. Cl.
*G10H 1/00* (2006.01)

(52) U.S. Cl. ................ 84/615; 84/626; 84/633; 84/653; 84/663; 84/665

(58) Field of Classification Search .................... 84/615, 84/626, 633, 653, 663, 665
See application file for complete search history.

(56) References Cited

U.S. PATENT DOCUMENTS

| | | | | |
|---|---|---|---|---|
| 4,231,276 A | * | 11/1980 | Ando et al. ...................... | 84/625 |
| 4,483,230 A | * | 11/1984 | Yamauchi ...................... | 84/603 |
| 5,012,086 A | * | 4/1991 | Barnard ...................... | 250/222.1 |
| 5,237,123 A | * | 8/1993 | Miller ............................... | 84/21 |
| 5,453,571 A | * | 9/1995 | Adachi et al. .................... | 84/658 |
| 5,552,559 A | * | 9/1996 | Sugiyama et al. .............. | 84/171 |
| 5,612,502 A | * | 3/1997 | Ura ................................. | 84/687 |
| 5,641,925 A | * | 6/1997 | Koseki ........................... | 84/462 |
| 5,753,842 A | * | 5/1998 | Kitamura ........................ | 84/604 |
| 5,824,930 A | * | 10/1998 | Ura et al. ........................ | 84/462 |
| 5,834,669 A | * | 11/1998 | Clift et al. ...................... | 84/462 |
| 5,909,028 A | * | 6/1999 | Yamamoto ................... | 250/221 |
| 5,990,409 A | * | 11/1999 | Takahashi et al. .............. | 84/724 |
| 5,998,727 A | * | 12/1999 | Toba et al. ...................... | 84/724 |
| 6,153,822 A | * | 11/2000 | Toba et al. ...................... | 84/724 |
| 6,194,643 B1 | * | 2/2001 | Meisel ............................. | 84/18 |
| 6,229,081 B1 | * | 5/2001 | Ura et al. ........................ | 84/462 |
| 6,231,221 B1 | * | 5/2001 | Godbillon et al. ............. | 362/521 |

(Continued)

FOREIGN PATENT DOCUMENTS

JP    62-232572    10/1987

(Continued)

OTHER PUBLICATIONS

English machine translation of Abstract for JP 10-026983, date of publication Jan. 27, 1998.

(Continued)

*Primary Examiner* — David S. Warren
(74) *Attorney, Agent, or Firm* — David W. Victor; Konrad Raynes & Victor LLP

(57) ABSTRACT

A method, operation position sensor device for an electronic musical, and musical instrument for detecting an operation position of an operation member in an electronic musical instrument. A determination is made of an amount of measured light resulting from the depression of the operation member has changed in excess of a predetermined difference value a number of times. A determination is made of a difference value of clock counts measured at a last two determinations that the measured light changed in excess of the predetermined difference value in response to determining that the amount of the measured light has changed in excess of the predetermined difference value the number of times. The difference value is converted to a key depression speed. A sound generation command is issued based on the key depression speed to a sound source.

32 Claims, 9 Drawing Sheets

U.S. PATENT DOCUMENTS

| | | | |
|---|---|---|---|
| 6,245,985 B1 * | 6/2001 | Sasaki et al. | 84/658 |
| 6,271,447 B1 * | 8/2001 | Fujiwara et al. | 84/21 |
| 6,297,437 B1 * | 10/2001 | Ura et al. | 84/423 R |
| 6,359,207 B1 * | 3/2002 | Oba et al. | 84/658 |
| 6,403,872 B2 * | 6/2002 | Muramatsu et al. | 84/724 |
| 6,489,550 B1 * | 12/2002 | Takahashi et al. | 84/724 |
| 6,501,012 B1 * | 12/2002 | Toba et al. | 84/724 |
| 6,515,213 B2 * | 2/2003 | Muramatsu et al. | 84/687 |
| 6,713,751 B2 * | 3/2004 | Muramatsu et al. | 250/221 |
| 6,870,151 B2 * | 3/2005 | Kato | 250/221 |
| 6,933,435 B2 * | 8/2005 | Kato et al. | 84/724 |
| 6,940,005 B2 * | 9/2005 | Muramatsu et al. | 84/21 |
| 6,992,241 B2 * | 1/2006 | Fujiwara | 84/21 |
| 7,019,201 B2 * | 3/2006 | Meisel | 84/16 |
| 7,049,576 B2 * | 5/2006 | Kato et al. | 250/221 |
| 7,115,807 B2 * | 10/2006 | Yamada et al. | 84/602 |
| 7,132,643 B2 * | 11/2006 | Kato | 250/221 |
| 7,339,105 B2 * | 3/2008 | Eitaki | 84/615 |
| 7,411,124 B2 * | 8/2008 | Muramatsu | 84/615 |
| 7,420,116 B2 * | 9/2008 | Fujiwara | 84/619 |
| 7,432,431 B2 * | 10/2008 | Hirota et al. | 84/462 |
| 7,521,627 B2 * | 4/2009 | Sasaki | 84/735 |
| 7,589,273 B2 * | 9/2009 | Uehara | 84/610 |
| 7,642,448 B2 * | 1/2010 | Kato | 84/724 |
| 7,709,719 B2 * | 5/2010 | Osuga | 84/437 |
| 7,723,598 B2 * | 5/2010 | Sasaki et al. | 84/477 R |
| 2001/0000569 A1 * | 5/2001 | Meisel | 84/688 |
| 2001/0003945 A1 * | 6/2001 | Muramatsu et al. | 84/658 |
| 2001/0007218 A1 * | 7/2001 | Tamaki et al. | 84/20 |
| 2002/0059862 A1 * | 5/2002 | Muramatsu et al. | 84/719 |
| 2002/0184989 A1 * | 12/2002 | Meisel | 84/216 |
| 2002/0194986 A1 * | 12/2002 | Kato et al. | 84/744 |
| 2003/0070526 A1 * | 4/2003 | Muramatsu et al. | 84/21 |
| 2003/0213355 A9 * | 11/2003 | Meisel | 84/216 |
| 2004/0221711 A1 * | 11/2004 | Kato et al. | 84/724 |
| 2005/0022649 A1 * | 2/2005 | Meisel | 84/16 |
| 2006/0016325 A1 * | 1/2006 | Fujiwara et al. | 84/723 |
| 2006/0162534 A1 * | 7/2006 | Muramatsu | 84/724 |
| 2006/0225563 A1 * | 10/2006 | Ohba | 84/744 |
| 2008/0011151 A1 * | 1/2008 | Kato | 84/724 |
| 2009/0100993 A1 * | 4/2009 | Komatsu | 84/724 |
| 2009/0151548 A1 * | 6/2009 | Kikumoto et al. | 84/640 |
| 2009/0178547 A1 * | 7/2009 | Hirano | 84/745 |
| 2009/0223345 A1 * | 9/2009 | Mann | 84/384 |
| 2009/0282962 A1 * | 11/2009 | Jones et al. | 84/21 |

FOREIGN PATENT DOCUMENTS

| | | |
|---|---|---|
| JP | 63-81397 | 4/1988 |
| JP | 10-026983 | 1/1998 |
| JP | 2006-201704 | 9/2010 |

OTHER PUBLICATIONS

English machine translation of abstract of JP 62232572, date of publication Oct. 13, 1987.

* cited by examiner

POSITION SENSING DEVICE

CROSS-REFERENCE TO RELATED FOREIGN APPLICATION

This application is a non-provisional application that claims priority benefits under Title 35, Unites States Code, Section 119(a)-(d) from Japanese Patent Application entitled "POSITION SENSING DEVICE" by Tadao KIKUMOTO and Mitsuhiro UMETA, having Japanese Patent Application Serial No. JP2007-322092, filed on Dec. 13, 2007, which application is incorporated herein by reference in its entirety.

BACKGROUND

1. Technical Field

Embodiments of the present invention generally relate to operation position sensor devices for electronic musical instruments which correctly detect operation positions of operation members, such as, keys of a keyboard device or the like.

2. Related Art

A key operation sensor device for a relatively inexpensive electronic musical instrument may detect key-depression speed of keys on the instrument by measuring a time difference in opening and closing between two or more switches provided on each of the keys. An electronic musical instrument in related art shown in FIG. 12 is provided with key switches each having a common member 103 and contacts 101 and 102, wherein key-depression speed is detected by measuring the time in which the common member 103 passes between the contacts 101 and 102.

A key operation sensor device for a relatively expensive electronic musical instrument may use various sensors to detect key depression speed and key depression force of keys on the instrument by measuring changes in pressure, magnetic force and the amount of reflection and transmission of light, which may occur in response to operations of the keys. For example, Japanese Laid-open Patent Application HEI 10-26983 (Patent Document 1) describes a sensor device having slits provided between a light emitting device and a photodetecting device. The slits are structured to continuously change the amount of light passing through the slits according to changes of the position of each key being operated, and the sensor device detects the position of the key operated based on the light detected by the photodetecting device. In the device described in Patent Document 1, two threshold light amounts are set corresponding to two key operation positions, and the key depression speed is obtained by measuring the time in which the amount of light detected by the photodetecting device passes these threshold light amounts.

Japanese Laid-open Patent Application SHO 63-81397 (Patent Document 2) describes a sensor device equipped with two pairs of light emitting elements and photodetecting element provided for each key at two operation positions of the key, and a shutter that is provided between the two pairs of light emitting element and photodetecting element and moves according to operations of the key. The sensor devices obtain the key depression speed by measuring the time in which the key passes the tow operation positions based on light detected by the respective photodetectors.

Japanese Laid-open Patent Application SHO 62-232572 (Patent Document 3) describes a sensor device shown in FIG. 13 and FIG. 14. The sensor device is equipped with a shutter 100 having two slits, a large slit a and a small slit b, attached to a key. The shutter 100 moves up and down upon depression of the key between a light emitting element 400 and a photodetecting element 500. The sensor device distinguishes the upper and lower slits by a difference in the amount of light passing through these two slits, detects the key depression position based on light detected by the photodetecting element 500, and detects the key depression speed by measuring the time in which the key passes two depression positions.

Japanese Laid-open Patent Application 2006-201704 (Patent Document 4) describes a sensor device equipped with two pairs (first pair and second pair) of light emitting element and photodetecting element provided in parallel with each other. A shutter that continuously changes the amount of transmission light according to changes in the position of a key being operated is provided between the light emitting element and photodetecting element in the first pair. Another shutter that transmits light only at two operation positions of the key is provided between the light emitting element and photodetecting element in the second pair. Based on the amount of light detected by the photodetecting element in the first pair at the time of detection of light by the photodetecting element in the second pair, the sensor device determines the relation between the amount of light detected by the photodetecting element in the first pair and the operation position of the key, and obtains the operation position of the key based on the amount of light detected by the photodetecting element in the first pair. In the sensor device described in Patent Document 4, light emitted from the light emitting element is guided through an optical fiber and a lens to the shutter, and the light that has passed through the shutter is guided through an optical fiber to the photodetecting element. Also, FIG. 2 of Patent Document 4 shows a state in which light emitted from the light emitting element is expanded by the lens placed on the side of the light emitting element into a parallel beam of light having a predetermined radius and guided to the shutter, and the parallel beam of light that has passed through the shutter is focused on the optical fiber on the light detecting side by the lens placed on the side of the photodetecting element.

In the case of the sensor system that uses opening and closing of switches, the key depression speed may not be accurately measured because the resilient force generated by the elasticity of the switches may act in excess on the keys more than necessary, and the contacts of the switches may wear out and deform after having been used for an extended period of time.

The method that detects changes in a continuous quantity such as light and magnetic is contactless and has no wear, but does not necessarily provide accurate measurement of position and speed of the key due to differences among the individual sensors, changes in the temperature and the like. In the sensor device described in Patent Document 1, the amount of light emission of light emitting elements and the photosensitivity of photodetecting elements may differ from one another among the individual elements, or the sensor device may be affected by changes in the ambient temperature, such that the key depression speed may be obtained at operation positions different from those intended by the designer. The sensor device described in Patent Document 2 can accurately obtain the timing at which the key passes two operation positions, but may have a complex structure because two pairs of light emitting elements and photodetecting elements need to be provided for each of the keys.

The sensor device described in Patent Document 3 provides some contrivances to minimize differences in the light emitting elements and the photodetecting elements and influences by temperature changes. However, as described below, the resolution of the positions of the slits is limited, such that the amount of transmitting light would become uncertain, which would generate error detections. Patent Document 3 shows changes in the amount of light passing through the slits which take place according to depression and release of the key, as shown in FIG. 15. As shown in the figure, a larger pulse b is generated after a smaller pulse a as the key is depressed. The time difference between the pulse a and the pulse b is measured, which is then converted to a key depression speed. Then, as the key is released, a larger pulse b is generated again and then a smaller pulse a occurs, and the key returns to the key's original state.

However, the light flux that has passed through the slit is spreading, such that the changes in the amount of light actually appear with its rising and falling being in continuous gentle hills and valleys due to dispersion, as shown in FIG. 16. With such an output of the photodetecting element, when the light flux relatively moves halfway in the larger slit b from its upper edge or lower edge, the change in the amount of light appears in a manner similar to a change that occurs when the light flux passes the smaller slit a. FIG. 17 shows the shutter 1 with its slits shown in enlargement, and FIG. 18 and FIG. 19 show movements of the photodetecting element 5 that moves relatively to the shatter 1. In FIG. 18, an upward arrow 1 on the far left side indicates that the key reaches the bottom dead point in full stroke, the next arrow 2 indicates that the photodetecting element 5 passes the slit b as the key returns, and the third arrow 3 indicates that the key is returning to the bottom dead point without going in a direction toward the initial position. The fourth arrow 4 indicates that the photodetecting element 5 returns from the middle of the hill to be presented by the slit b without passing its apex. The aforementioned movements cause changes in the amount of light as indicated by four pulses shown in FIG. 20 from the left side thereof, pulse a, pulse b, pulse b and pulse a. These changes are generally the same as the changes in the amount of light occurring when the key reaches the bottom dead point in full stroke, and then returns to the initial position, as shown in FIG. 16. Further, if the photodetecting element 5 hovers around the upper edge of the slit b as indicated by arrows 5, 6 and 7, the resultant pulse pattern becomes generally the same as the pattern to be generated when the key is depressed twice in succession, as indicated with successive pulses in FIG. 20. FIG. 19 shows an example of key movements in which the photodetecting element 5 relatively hovers near the upper edge of the slit b and moves to the apexes. Such movements are often generated by bouncing of the key or the hand of the performer. This problem is caused by the fact that the sensor output corresponding to the operation position is symmetrical through its apex due to the poor resolution of the slits and sensor.

The sensor device described in Patent Document 4 needs to be equipped with two pairs of light emitting elements and photodetecting elements for each of the keys and thus has a complex structure. Moreover, in the device described in Patent Document 4, neither the lens on the side of the light emitting element nor the lens on the side of the photodetecting element brings a focal point on the shutters, the light spot to be projected onto the shutter from the light emitting element is expanded to have a certain expansion, and light in the light spot having the certain expansion on the shutter is guided to the photodetecting element. Accordingly, even when the key is moved in a manner that the emitted light passes the shutter at a boundary portion where the amount of light transmission drastically changes from the maximum to the minimum or from the minimum to the maximum, the amount of light guided to the photodetecting element changes gently, which lowers the accuracy in detecting the key operation position, and makes it difficult to obtain an accurate operation position.

In the electronic musical instrument market, accurate and inexpensive operation position sensor devices with long serviceable life and excellent power of expression, which solve the problems described above, are demanded.

SUMMARY

In accordance with an advantage of some aspects of the invention, there is provided an operation position sensor device for an electronic musical instrument, such as, a keyboard, which accurately detects operation positions of operation members, such as, keys of the keyboard.

An operation position sensor device for an electronic musical instrument in accordance with a first embodiment of the invention includes: an operation member; a light emitting section; a photodetecting section; a light amount controlling member that is placed in an optical path between the light emitting section and the photodetecting section, and controls the amount of light inputted from the light emitting section to the photodetecting section according to an operation position of the operation member; and an operation position sensor section that detects the operation position of the operation member based on the amount of light received by the photodetecting section, wherein the amount of light to be controlled by the light amount controlling member changes stepwise according to changes in the operation position of the operation member in the same direction of the changes, and the operation position sensor section determines that the operation position of the operation member has shifted from one of operation position zones to another adjacent one of the operation position zones when the amount of light detected by the photodetecting section changed stepwise, and determines to which one of adjacent ones of operation position zones the operation position has shifted from the one of operation position zones depending on whether the amount of light has increased or decreased.

An operation position sensor device for an electronic musical instrument in accordance with a second embodiment of the invention includes: an operation member; a light emitting section; a photodetecting section; a light amount controlling member that is placed in an optical path between the light emitting section and the photodetecting section, and controls the amount of light inputted from the light emitting section to the photodetecting section according to an operation position of the operation member; and an operation position sensor section that detects the operation position of the operation member based on the amount of light received by the photodetecting section, wherein the amount of light to be controlled by the light amount controlling member generally continuously changes in a first direction when the operation position is within at least one predetermined operation position zone, corresponding to changes in a predetermined direction of the operation position of the operation member, and discretely changes in a second direction opposite to the first direction when the operation position moves from outside the predetermined operation position zone to the predetermined operation position zone or the operation position moves from the predetermined operation position zone to outside the predetermined operation position zone; and the operation position sensor section judges, when the amount of light detected by the photodetecting section changes more than a predetermined value, that the operation position of the operation member has moved from outside the predetermined operation position zone to the predetermined operation position zone or the operation position has moved from the predetermined operation position zone to outside the predetermined operation position zone.

The operation position sensor device for an electronic musical instrument in accordance with a first aspect of the first embodiment or the second embodiment may further include an operation speed sensor device that detects an operation speed of the operation member by measuring with the operation position sensor section an elapsed time in which the operation position of the operation member passes a predetermined operation position zone.

In the operation position sensor device for an electronic musical instrument in accordance with a second aspect of the second embodiment, the operation position sensor section may detect an operation position of the operation member within the predetermined operation position zone when the amount of light detected by the photodetecting section does not change in excess of the predetermined value.

The operation position sensor device for an electronic musical instrument in accordance with a third aspect of the first embodiment or the second embodiment may include a lens having a focal point on the light amount controlling member in front of the light emitting section.

The operation position sensor device for an electronic musical instrument in accordance with a fourth aspect of the first embodiment or the second embodiment may include a lens having a focal point on the light amount controlling member in front of the photodetecting section.

The light amount controlling member may be capable of controlling the amount of light transmission or controlling the amount of light reflection.

According to the operation position sensor device in accordance with the first embodiment, an operation direction of the operation member, such as, a key can be reliably judged depending on whether the amount of light changes stepwise in an increasing direction or changes stepwise in a degreasing direction, and the timing at which the operation member passes a predetermined operation position can be accurately obtained by detecting a stepwise change occurred in the amount of light.

According to the operation position sensor device in accordance with the second embodiment, the timing at which the operation member, such as, a key passes a predetermined operation position can be accurately obtained by detecting an event in which the amount of light has changed in excess of a predetermined value.

According to the operation position sensor device in accordance with the first aspect of the first embodiment or the second embodiment, in addition to the effects described above, the timing at which the operation member, such as, a key passes a predetermined operation position zone for detecting an operation speed can be accurately determined, and the operation speed of the operation member can be accurately obtained based on the timing.

According to the operation position sensor device in accordance with the second aspect of the second embodiment, in addition to the effects described above, changes in the operation position of the operation member such as a key can be continuously obtained in an operation position zone in which the amount of light continuously changes.

According to the operation position sensor device in accordance with the third aspect of the first embodiment or the second embodiment, in addition to the effects described above, the size of the light spot projected from the light emitting section onto the light amount controlling member can be reduced, such that the operation position of the operation member can be more accurately obtained. Also, light emitted from the light emitting section is focused, such that the amount of light of the light emitting section can be suppressed. Accordingly, the power consumption by the light emitting section can be reduced, and the service life of the light emitting section can be extended.

According to the operation position sensor device in accordance with the fourth aspect of the first embodiment or the second embodiment, in addition to the effects described above, the size of the light spot on the light amount controlling member to be detected by the photodetecting section can be reduced, such that the operation position of the operation member can be more accurately obtained.

DESCRIPTION OF EXEMPLARY EMBODIMENTS

Preferred embodiments of the invention are described below with reference to the accompanying drawings.

Figure 1:
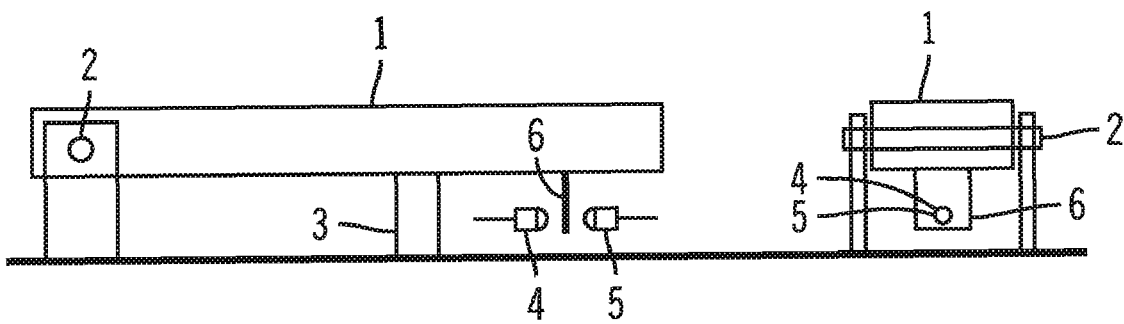
FIG. 1 is a schematic diagram showing the relation among a key, a light emitting element, a photodetecting element and a shutter in accordance with an embodiment of the invention.
Figure 2:
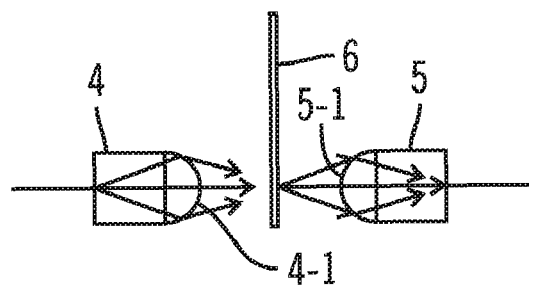
FIG. 2 is a schematic diagram showing the relation among the light emitting element, the photodetecting element, lenses attached to the light emitting element and the photodetecting element, and the shutter shown in FIG. 1.
Figure 3:
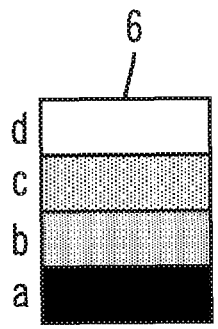
FIG. 3 is a view showing a transparency change characteristic of a transmission film of the shutter shown in FIG. 1.
Figure 4:
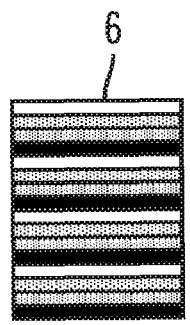
FIG. 4 is a view showing another transparency change characteristic of a transmission film of the shutter shown in FIG. 1.
Figure 5:
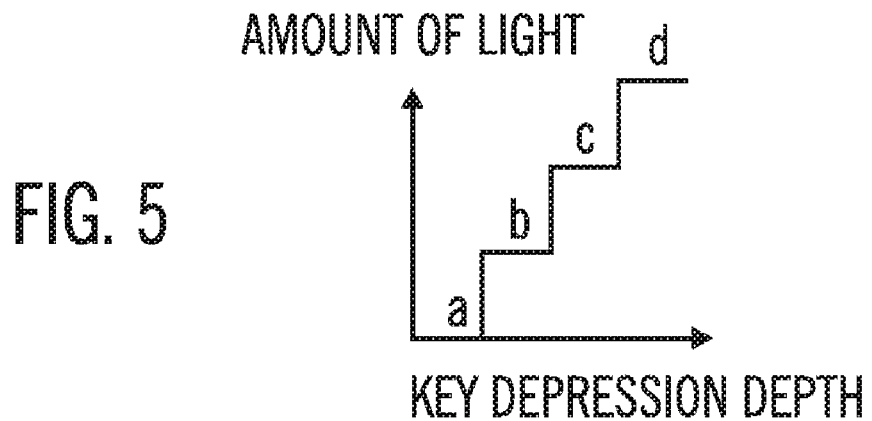
FIG. 5 is a graph showing changes in the current flowing in the photodetecting element when the shutter having the transmission film of FIG. 3 moves with the operation of the key.
Figure 6:
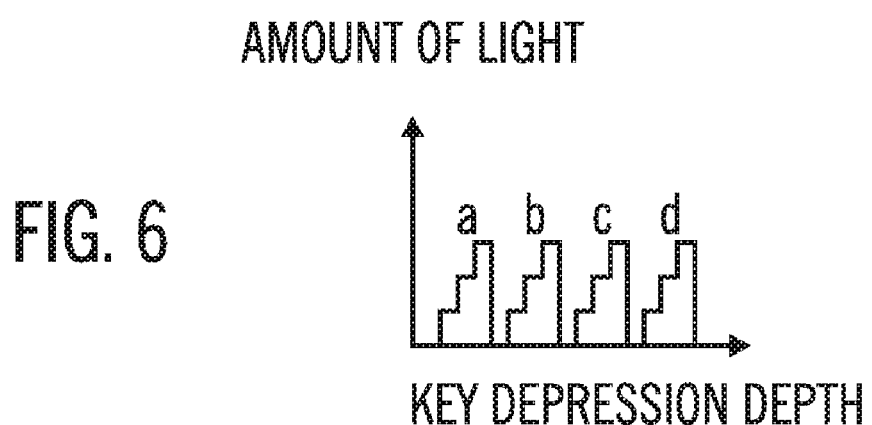
FIG. 6 is a graph showing changes in the current flowing in the photodetecting element in another pattern when the shutter having the transmission film of FIG. 4 moves with the operation of the key.

FIG. 1 is a schematic diagram showing the relation among keys, light emitting elements, photodetecting elements and shutters in an operation position sensor device for an electronic musical instrument in accordance with an embodiment of the invention. FIG. 1 shows a representative structure for each one of the keys 1, wherein a shutter 6 is attached to the key 1, and the key 1 is placed between a light emitting element 4 and a photodetecting element 5 which are affixed to a keyboard base section. Reference numeral 2 denotes an axis of rotation of the key 1, and reference numeral 3 denotes a stopper that limits the rotational movement of the key 1. The photodetecting element 5 is disposed at a position facing an optical axis of the light emitting element 4. With respect to FIG. 2, a lens 4-1 and a lens 5-1 are disposed at front portions of the light emitting element 4 and the photodetecting element 5, respectively, and are adjusted to have focal points on a transmission film of the shutter 6 as shown in FIG. 2. In other words, the transmission film of the shutter 6 as a light amount controlling member is inserted in an optical path extending from the light emitting element 4 to the photodetecting element 5. The transmission film of the shutter 6 may have transparency that changes stepwise through zones a, b, c and d, as shown in FIG. 3. In this case, when the shutter 6 moves up and down with the key, the current provided by the photodetecting element 5 generally changes stepwise, as shown in FIG. 5. When the transparency of the transmission film of the shutter 6 is set such that plural sets of stepwise gradations are arranged repeatedly, as shown in FIG. 4, changes in the current of the photodetecting element 5 appear in stepwise patterns successively repeated in a manner as shown in FIG. 6. Although not shown, in the case of a shutter having a transmission film that repeats transparency changes, in each of which the transparency continuously increases and then abruptly decreases, the current of the photodetecting element 5 appears in a sawtooth waveform having discontinuity points at its apexes, as shown in FIG. 7.

Figure 7:
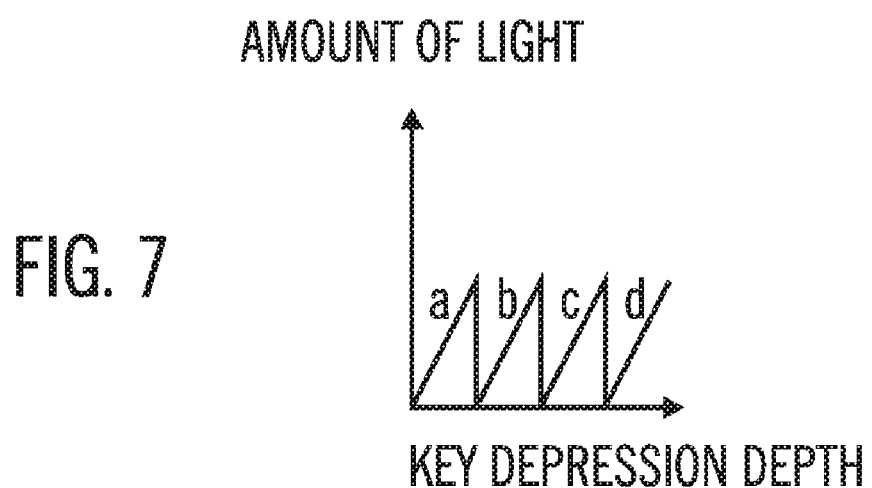
FIG. 7 is a graph showing changes in the current flowing in the photodetecting element in a still another pattern when the shutter having an unshown transmission film moves with the operation of the key.

It is noted that the length of each of the zones, zone a, zone b, zone c and zone d, shown in FIG. 5, FIG. 6 and FIG. 7, in other words, the length of each of the zones interposed by boundaries at which the amount of light drastically changes may be optimally adjusted to correspond to a physical zone of a key depression, according to the kind of each musical sound or the like, and may not necessarily be at equal intervals.

Because there are provided the boundaries at which the amount of light passing through the shutter abruptly changes according to the depth of key depression, it is possible to detect an event in which the depressed key has passed a specified depth corresponding to each of the boundaries according to abrupt changes in the amount of light. As the depths of key depression are detected based on abrupt changes in the amount of light, the position of the key depression can be accurately detected even when there are individual specificities and changes in temperature present in the amount of light emission of the light emitting element 4 and the sensitivity of the photodetecting element 5. The characteristic of each of the shutters shall be described in detail below.

The output of the photodetecting element 5 rapidly changes at each of the boundaries where the amount of light rapidly changes. In particular, the more the focus of the lens 5-1 of the photodetecting element 5 is accurately brought on the transmission film of the shutter 6, the smaller the light spot on the transmission film becomes, and the sharper the change occurs, in other words, the more the accuracy in detecting the position improves when moving the shutter up and down. The lens may preferably be in a cylindrical shape, which may be used for bar-code reading, than in a spherical shape, as the cylindrical shaped lens can take in light in a greater amount. Also, by bringing the focus of the lens 4-1 of the light emitting element 4 on the transmission film of the shutter 6, the light spot projected on the transmission film can be made smaller, which can further improve the accuracy in position detection. Also, by providing the lens 4-1 on the light emitting element 4, light from the light emitting element can be focused and projected on the transmission film, such that the amount of light to be generated by the light emitting element can be suppressed. For this reason, the power consumption of the light emitting element can be reduced, and the service life of the light emitting element can be extended.

If the key depression depth can be quantitatively, accurately determined in a stepwise fashion, in other words, a specified depth of key depression can be accurately specified, in a manner described above, the speed of key depression can be accurately detected by measuring the elapsed time in key depression for the specified depth, like the switch system in related art. Next, the processes of detecting the position and speed are briefly described.

Figure 8:
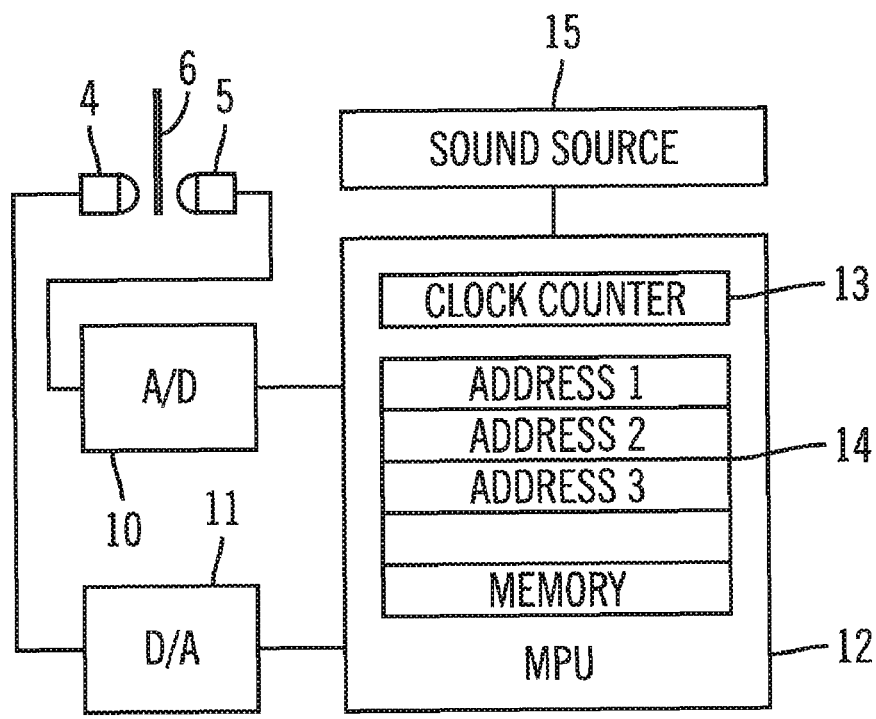
FIG. 8 is a block diagram of an electrical composition of the operation position sensor device having the light emitting element, the photodetecting element and the shutter of FIG. 1.

FIG. 8 is a block diagram of the electrical composition of an operation position sensor device for an electronic musical instrument in accordance with an embodiment of the invention. A light emitting element 4, a photodetecting element 5 and a shutter 6 shown in FIG. 8 correspond to the light emitting element 4, the photodetecting element 5 and the shutter 6 shown in FIG. 1 and FIG. 2, respectively. A microprocessor (MPU) 12 includes a clock counter 13 that counts clocks per a predetermined time period, a memory 14 that temporarily stores data, and an unshown memory that stores a conversion table shown in FIG. 9 to be described below and a program.

The microprocessor 12 fetches changes in the output of the photodetecting element 5 through an A/D converter 10, makes appropriate correction and adjustment, and issues commands for sound generation, sound muting, tone control and the like to a sound source 15, and outputs to a D/A converter 11 a signal for controlling the amount of light of the light emitting element 4, thereby adjusting the brightness of the light emitting element 4. The A/D converter 10 that measures the output of the photodetecting element 5 is deemed to have a sufficient resolution greater than that of transparency steps of the shutter 6. The output of the D/A converter 11 is deemed to be set at a predetermined value such that the light emitting element 4 emits an appropriate amount of light.

When the light flux passing through the transmission film in response to depressing of the key passes a boundary between adjacent ones of the zones described above, the output of the photodetecting element 5 detected through the A/D converter 10 rapidly changes. In this case, the more the photodetecting element 5 is focused on the transmission film, the sharper the change takes place, such that the boundary between the adjacent zones can be more accurately discriminated, as described above.

The microprocessor 12 monitors the output of the A/D converter 10 connected to the photodetecting element 5 at a predetermined sampling cycle, and determines, at the time when a rapid change takes place, that the depth of key depression has passed a predetermined depth corresponding to the aforementioned boundary, as described above. When a difference value in a sampling time interval exceeds a predetermined value, this can be discriminated as an occurrence of a rapid change. The predetermined value may be a threshold value by which a stepwise change in transparency of the transmission film of the shutter can be sufficiently identified. It is noted that, in the case of a transmission film whose transmittance changes only in a stepwise fashion, as shown in FIG. 3, it is also possible to determine that there is a stepwise change when the output of the A/D converter 10 traverses a level corresponding to each of the transmittance boundaries. It is noted that, when many steps in transmittance are defined in the transmission film, in other words, when the difference in transmittance level at a boundary between adjacent ones of the transmission steps is small, an error operation may occur depending on differences in the amount of light of the light emitting element 4 and in the sensitivity of the photodetecting element 5. Therefore the method described above may be limited to the case where the number of steps in transmittance is not so high. Also, the sampling cycle may be set within the range in that a rapid change in the output of the A/D converter 10 can be detected, and the light flux can be detected as being successively shifting through the defined zones of the transmission film even when the key is depressed at a maximum speed.

The microprocessor 12 senses that a key is being depressed, when the depth at which the boundary passes, upon depression of the key, is a key depression start position, and makes the clock counter 13 to start counting clocks. The microprocessor 12 stores the clock count value of the clock counter 13 each time the key depression depth passes each of the boundaries. Based on a difference value between a clock count value of the clock counter 13 stored when the key depression depth passed one of the boundaries and another clock count value measured when the key depression depth passed the next one of the boundaries, an elapsed time in which the key depression depth passes a zone interposed between these boundaries can be obtained, and a key depression speed can be obtained based on the elapsed time. An initial speed of the key depression may be calculated based on an elapsed time at the initially passed zone. However, in order to obtain the final speed of the key depression from an elapsed time at the succeeding zone, the counted value measured at the initially passed zone is temporarily stored. When the boundary passes a key depression speed detection zone upon a key depression, the microprocessor 12 refers the elapsed time in the key depression speed detection zone with the conversion table, and converts the same to a final key depression speed.

Figure 10A:
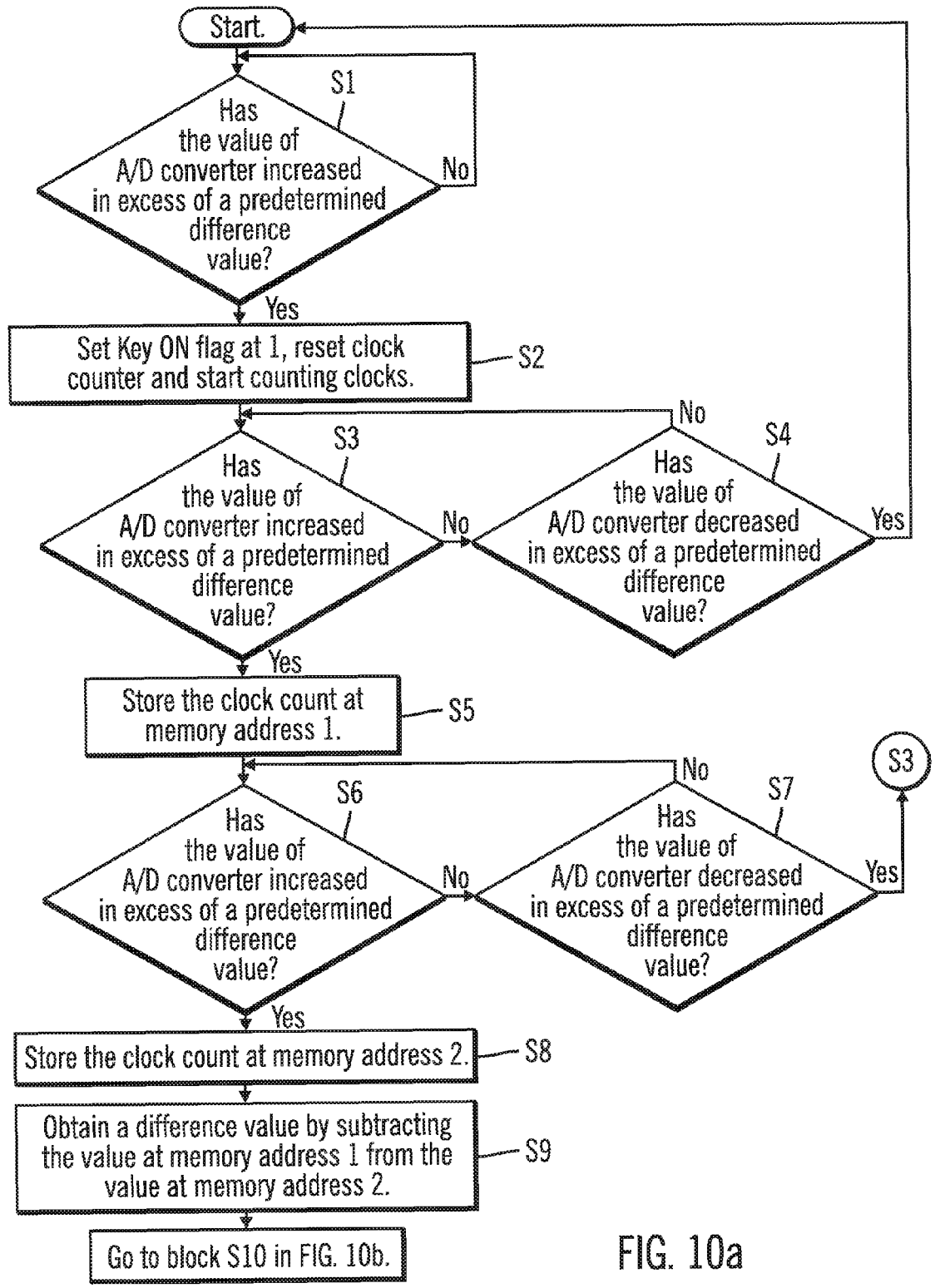
FIGS. 10a and 10b comprise a flowchart of processing contents executed by the microprocessor (MPU) of FIG. 8 when the shutter of FIG. 5 is used.
Figure 10B:
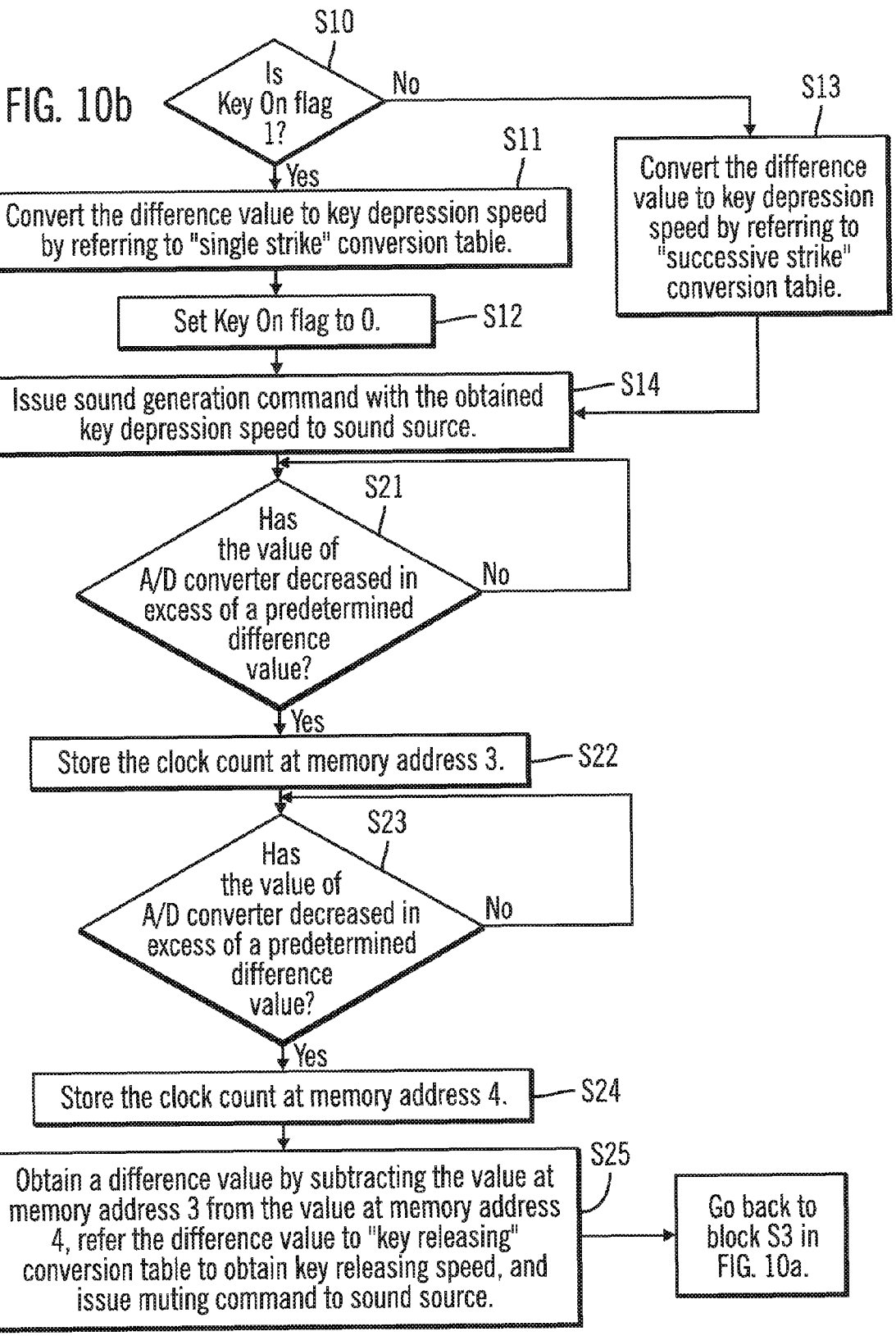

Next, when the shutter with stepwise transmission gradations shown in FIG. 3 is used, in other words, when the transparency of the transmission film of the shutter 6 changes stepwise in one direction as the key depression depth increases, the microprocessor 12 executes a process according to a flow chart shown in FIGS. 10a and 10b. The process is described in detail with reference to the flow chart. The process starts when the electronic musical instrument is powered on, and continues until the power is turned off. It is assumed that, at an initial state, the key is not yet depressed. When the key is not depressed, the light flux passing through the transmission film of the shutter 6 is in the zone a in FIG. 3, where the transmittance is zero, and the output of the photodetecting element 5 is at a minimum value.

In step S1, it is judged as to whether a difference value between a present output and a preceding output of the A/D converter 10 increased in excess of a predetermined threshold value. The process proceeds to step S2 when the difference value increased in excess of the predetermined threshold value, and executes step S1 again when the difference value does not increase in excess of the predetermined threshold value. The process shown in FIGS. 10a and 10b is designed in a manner that, in the process of reading the output of the A/D converter 10, like in step S1, when the elapsed time after executing the step of reading the output of the A/D converter 10 exceeds a waiting time corresponding to a predetermined sampling cycle, the step of reading the output of the A/D converter 10 is executed again. In this manner, the judgment on the outputs of the A/D converter 10 is executed at each of the predetermined sampling cycles. Also in the process shown in FIGS. 10a and 10b, in the processing of reading the output of the A/D converter 10, like in step S1, a value read at this instance is stored, and used to obtain a difference value between the value stored and a latest value obtained when the step of reading the output of the A/D converter 10 is conducted in the next instance. It is noted that, at the time of power-on, the output value of the A/D converter 10 in a preceding instance is deemed to be initialized to the same value as the output value of the A/D converter 10 in the state in which the key is not depressed.

In the initial state, the light flux is within the zone a of the transmission film of the shutter. Therefore, when it is judged in step 1 that a difference value between the output of the A/D converter 10 stored in a preceding instance and the presently obtained output exceeded a predetermined threshold value, this means that the light flux moved from the zone a, crossing the boundary between the zone a and the zone b, and entered the zone b as the key depression position becomes deeper. In step S2, a "Key ON" flag indicating the start of a key depression is set to 1 and at this moment on, clock counting by the clock counter 13 is started. Upon completion of step S2, the process proceeds to step S3.

In step S3, the output of the A/D converter 10 is continuously monitored, and it is judged as to whether a difference value between the output of the A/D converter 10 measured in a preceding instance and the present output of the A/D converter 10 increased in excess of the predetermined threshold value. At this moment, the light flux is on the zone b of the transmission film of the shutter. Therefore, if it is judged that a difference value between the preceding output and the present output of the A/D converter 10 exceeded a predetermined threshold value, this means that the light flux moved from the zone b, traversing the boundary between the zone b and the zone c, and entered the zone c, as the key is further depressed deeper. If it is determined in step S3 that the light flux moved over the boundary between the zone b and the zone c of the transmission film of the shutter, the process proceeds to step S5; and if not, the process proceeds to step S4.

In step S4, it is judged as to whether a difference value between the output of the A/D converter 10 measured in a preceding instance and the present output of the A/D converter 10 decreased in excess of a predetermined threshold value. If the difference value decreased in excess of the predetermined threshold value, the process returns to step S1. If the difference value did not decrease in excess of the threshold value, the process returns to step S3. When it is judged that the difference value between the outputs of the A/D converter 10 decreased in excess of the predetermined threshold value, this means that the light flux moved beyond the boundary between the zone b and the zone a of the transmission film of the shutter, and returned to the zone a, as the key depression position becomes shallower.

In step S5, a clock count value measured at the time when the light flux passes over the boundary between the zone b and the zone c of the transmission film is stored at memory address 1, and the process proceeds to step S6. It is noted that an initial speed of the key depression can be obtained with an elapsed time in which the light flux passes through the zone b, but the description thereof is omitted for simplification.

In step S6, it is judged as to whether a difference value between the preceding output and the present output of the A/D converter 10 increased in excess of a predetermined threshold value. At this moment, the light flux is on the zone c of the transmission film of the shutter, and therefore, if it is judged that the difference value between the preceding output and the present output of the A/D converter 10 exceeded the predetermined threshold value, this means that the light flux moved over the boundary between the zone c and the zone d, and entered the zone d, as the key is further depressed deeper. If it is judged in step S6 that the light flux moved over the boundary between the zone c and the zone d of the transmission film of the shutter, the process proceeds to step S8; and if not, the process proceeds to step S7. The final speed of the key depression may be obtained during a period in which the light flux passes the zone c of the transmission film.

In step S7, it is judged as to whether a difference value between the preceding output and the present output of the A/D converter 10 decreased in excess of a predetermined threshold value. If the difference value decreased in excess of the predetermined threshold value, the process returns to step S3. If the difference value did not decrease in excess of the threshold value, the process returns to step S6. When it is judged in step S7 that the difference value between the outputs of the A/D converter 10 decreased in excess of the predetermined threshold value, this means that the light flux moved beyond the boundary between the zone c and the zone b of the transmission film of the shutter, and entered the zone b, as the key depression position becomes shallower.

Figure 9:
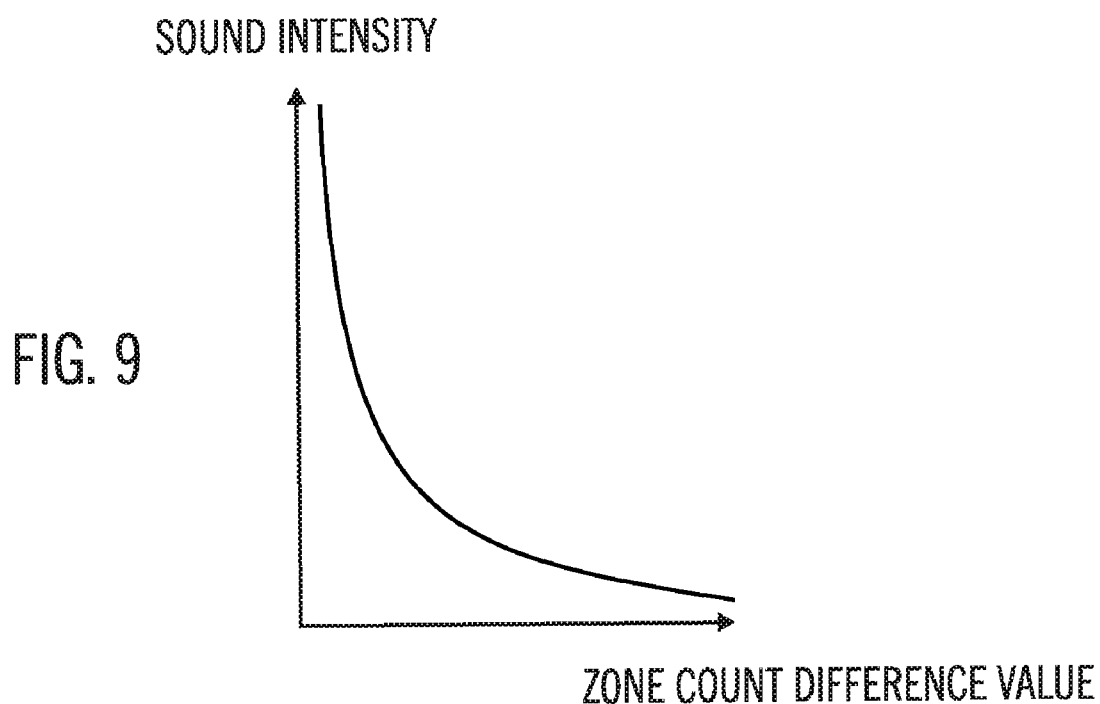
FIG. 9 shows a conversion table used by a microprocessor (MPU) of FIG. 8 for converting zone count difference values to key depression speeds (sound intensity).

In step S8, a clock count value measured at the time when the light flux passes over the boundary between the zone c and the zone d of the transmission film is stored at memory address 2, and the process proceeds to step S9. Step S9, step S10, step S11 and step S12 are a process to obtain the final speed of the key depression from the elapsed time in which the light flux passes the zone c of the transmission film. In step S9, the clock count value measured at the beginning point of the zone c stored at memory address 1 is subtracted from the clock count value measured at the end point of the zone c stored at memory address 2, thereby obtaining a difference value. Based on the obtained clock count difference value, the count difference value is converted to a sound intensity through referring to a conversion table for converting zone count difference values to key depression speeds (sound intensity) shown in FIG. 9. Two types of conversion tables may be prepared for single key strikes and successive key strikes. In the steps of FIGS. 10a and 10b, it is judged as to whether the key depression belongs to a single strike or successive strikes. When the same key is successively struck at high speeds, the light flux would not return to the zone a of the shutter, but may repeatedly reciprocate between the zone b and the zone d. Therefore, in the case of successive key strikes, it is necessary to refer to a conversion table with characteristics different from those of a conversion table that is used for single key strikes in which a key is depressed after the light flux has returned to the zone a. Branching to single strike or successive strike may be made by judging the Key ON flag that has been set to 1 in step S2. It is noted that FIG. 9 shows, as an example, only a single strike conversion table among the two types of conversion tables. When it is judged in step S10 that the key depression belongs to a single strike, the process proceeds to step S11. If it is judged to be successive strikes, the process proceeds to step S13.

In step S11, the zone count difference value is referred to the conversion table for single strikes, whereby the value is converted to sound dynamics data in MIDI or the like, and the process proceeds to step S12. In step S12, the Key ON flag that designates a single strike is set to zero (0), and the process proceeds to step S14. In step S13, the key depression is determined in step S10 as belonging to successive strikes, the zone count difference value is referred to the conversion table for successive strikes, whereby the value is converted to sound dynamics data in MIDI or the like, and the process proceeds to step S14. In step S14, a sound generation command with the sound intensity in a single strike or successive strikes is issued to the sound source 15, and the process proceeds to step S21. The steps so far conducted are a process to issue a sound generation command based on a key depression.

Next, descriptions are made as to detection of a key releasing speed when the key is released and the shutter upwardly returns, and a sound muting command to the sound source.

In step S21, it is judged as to whether a difference value between the preceding output and the present output of the A/D converter 10 decreased in excess of a predetermined threshold value. If the difference value decreased in excess of the predetermined threshold value, the process proceeds to step S22. If the difference value did not decrease in excess of the threshold value, step S21 is executed again. When it is judged in step S21 that the difference value between the outputs of the A/D converter 10 decreased in excess of the predetermined threshold value, this means that the light flux moved beyond the boundary between the zone d and the zone c of the transmission film of the shutter, and entered the zone c, as the key depression position becomes shallower, in other words, the key has moved and entered a key releasing process.

In step S22, a clock count value measured at this moment is stored at memory address 3, and the process proceeds to step S23. In steps S23, it is judged as to whether a difference value between the preceding output and the present output of the A/D converter 10 decreased in excess of a predetermined threshold value. If the difference value decreased in excess of the predetermined threshold value, the process returns to step S24. If the difference value did not decrease in excess of the threshold value, the processing in step S23 is executed again. When it is judged in step S23 that the difference value between the outputs of the A/D converter 10 decreased in excess of the predetermined threshold value, this means that the light flux moved beyond the boundary between the zone c and the zone b of the transmission film of the shutter, and entered the zone b, as the key depression position becomes shallower.

In step S24, the clock count value measured at this moment is stored at memory address 4, and the process proceeds to step S25. In step S25, the value stored at memory address 3 is subtracted from the value stored at memory address 4, thereby obtaining a clock count difference value for passing the zone c. The clock count difference value is referred to a key releasing table, whereby a key releasing speed is obtained. A muting command indicating a muting speed corresponding to the obtained key releasing speed is issued to the sound source 15. In accordance with the present embodiment, the key releasing sequence does not distinguish between a single strike and a successive strike, and further the key releasing table may be substituted for the conversion table for successive strikes.

When step S25 is finished, the light flux stays in the zone b of the transmission film of the shutter, and the process proceeds to step S25.

When the key depression position becomes shallower again due to successive key strikes, the process proceeds from step S3 to step S5. When the key depression position further becomes shallower, the process proceeds from step S3 to step S4.

As described above, when the shutter whose transparency changes stepwise, as shown in FIG. 3, is used, in other words, when the transparency of the transmission film of the shutter 6 changes stepwise in one direction with an increase in the key depression depth, timings at which the transparency rapidly changes can be accurately detected. Therefore, detection of a timing at which the key depression depth reaches a specified depth would become hard to be influenced by differences in the amount of light emitting element 4 and the sensitivity of the photodetecting element 5. Also, the transparency only changes in one direction with respect to changes in the key depression depth, such that, even when the key depression direction in a key depression process changes, the key depression direction would not be mistakenly detected.

Next, the case where an operation position sensor device uses a shutter having a transmission film whose transparency changes in a sawtooth profile according to a key depression depth, as shown in FIG. 7, is described. The transmission film with the transparency change characteristic indicated in FIG. 7 is characterized in that, in the zones whose transparency continuously changes, the transparency in any of the zones continuously changes in the same one direction with respect to a key depression depth, and the transparency abruptly changes at each boundary between adjacent ones of the zones in a direction opposite to the aforementioned one direction with respect to the key depression depth.

Unlike the shutter with stepwise transparency gradation shown in FIG. 5, the amount of light in each of the zones of the shutter shown in FIG. 7 continuously increases as the key is depressed, and abruptly attenuates at each of the boundaries between adjacent ones of the zones, which requires a process different from the process conducted with the shutter with stepwise transparency gradation shown in FIG. 5. Moreover, the amount of light continuously changes according to a key depression in each of the zones such that finer changes can be detected depending on the requirement. In accordance with the present embodiment, not only the key depression final speed, but also a pressure change after a key depression, in other words, so-called after touch are detected at a continuous slope in the zone d shown in FIG. 7 of the shutter transmission film. Therefore, a cushioning member composed of felt, rubber or the like may be provided at the top end of the stopper 3 shown in FIG. 1 such that the key can be resiliently received by the cushioning member, and further lowered by a further depressing pressure after the key depression.

The process executed by the microprocessor 12 is described in detail below with reference to FIGS. 11a and 11b.

Processing from step S101 through step S114 are executed in a key depression process, and correspond to the processing executed in steps S1 through S14 shown in FIG. 10b, respectively, and therefore their detailed description is omitted. However, in the case of the shutter with sawtooth shaped transparency gradation shown in FIG. 7, the amount of light gradually increases within each of the zones with an advancing key depression, and the amount of light abruptly decreases when the light flux crosses a boundary between adjacent ones of the zones, unlike the shutter with stepwise transparency gradation shown in FIG. 5. Therefore, the processing contents for judging whether or not the light flux has passed a boundary in the process flow in FIGS. 11a and 11b is different from the process flow shown in FIGS. 10a and 10b. For example, in step S101 where it is judged as to whether the light flux has moved from the zone a into the zone b of the transmission film crossing over the boundary, a processing to judge as to whether a difference value between the preceding output and the present output of the A/D converter 10 decreased in excess of a predetermined threshold value is executed. Processing to judge as to whether the light flux has passed the other boundaries are similarly conducted.

Processing in step S115 and thereafter are executed in a key releasing process. In step S115, it is judged as to whether a difference value between the preceding output and the present output of the A/D converter 10 increased in excess of a predetermined threshold value. The process proceeds to step S121 when the difference value increased in excess of the predetermined threshold value, but proceeds to step S118 when the difference value does not increase in excess of the predetermined threshold value. When it is judged in step S115 that the output of the A/D converter 10 increased in excess of the predetermined threshold value, this means that the light flux moved beyond the boundary between the zone d and the zone c of the transmission film of the shutter, and entered the zone c, as the key depression position becomes shallower. When it is judged in step S115 that the output of the A/D converter 10 does not increase in excess of the predetermined threshold value, this means that the light flux remains within the zone d of the transmission film of the shutter. When the light flux stays within the zone d, the processing for aftertouch is executed.

In step S118, the output value of the A/D converter 10 is converted to aftertouch intensity in MIDI or the like, and the process proceeds to step S119. The obtained aftertouch intensity is issued to the sound source 15 in step S119, and the process returns to step S115. Changes in the key depression depth with aftertouch after completion of the key depression take place slowly, such that the changes can be sampled at a longer cycle, compared to the case of detection of changes in the key depression depth during a key depressing process. For this reason, the processing for aftertouch may be executed in a longer processing cycle, compared to the processing to be executed during a key depressing process. Also, in step S114, a pressure force on the cushioning member generated when the key 1 collides with the stopper 3 may be read through the A/D converter 10 to generate pressure data immediately after the key strike, and the pressure data may be issued as a sound generation command to the sound source, together with the aforementioned key depression speed.

When it is judged in step S115 that the light flux entered the zone c of the transmission film of the shutter as the key depression position became shallower, this means that the key has entered the key releasing process. Processing in step S121 through step S124 correspond to the processing in step S22 through step S25 shown in FIG. 10b, respectively, and therefore their detailed description is omitted. However, the processing in step S122 to detect as to whether the light flux has passed over the boundary between the zone c and the zone b of the transmission film of the shutter and entered the zone b as the key depression position becomes shallower is different from the processing in step S23 in its processing contents, but its principle is the same as the processing in step S115.

Figure 11A:
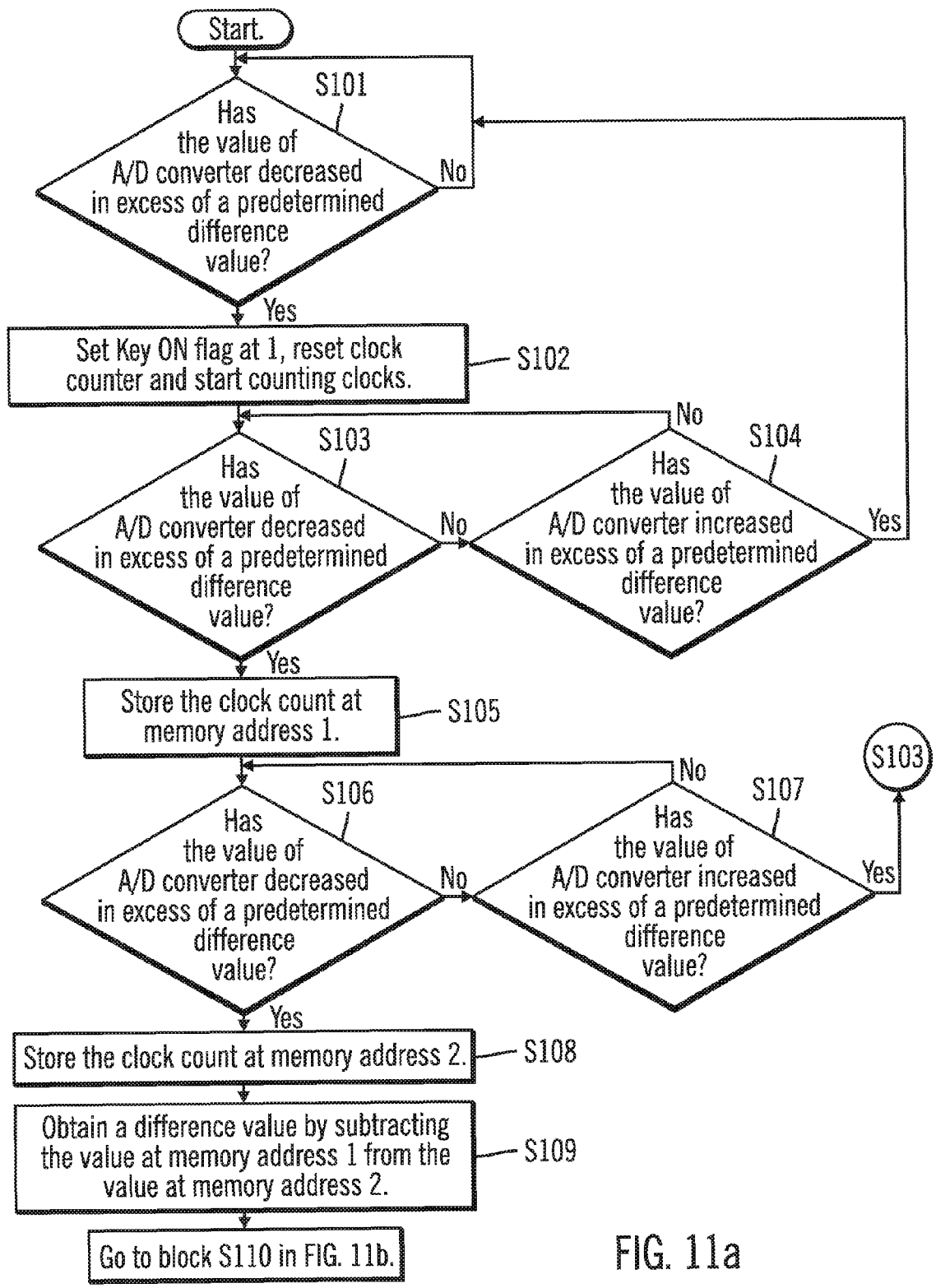
FIGS. 11a and 11b comprise a flowchart of processing contents executed by the microprocessor (MPU) of FIG. 8 when the shutter of FIG. 7 is used.
Figure 11B:
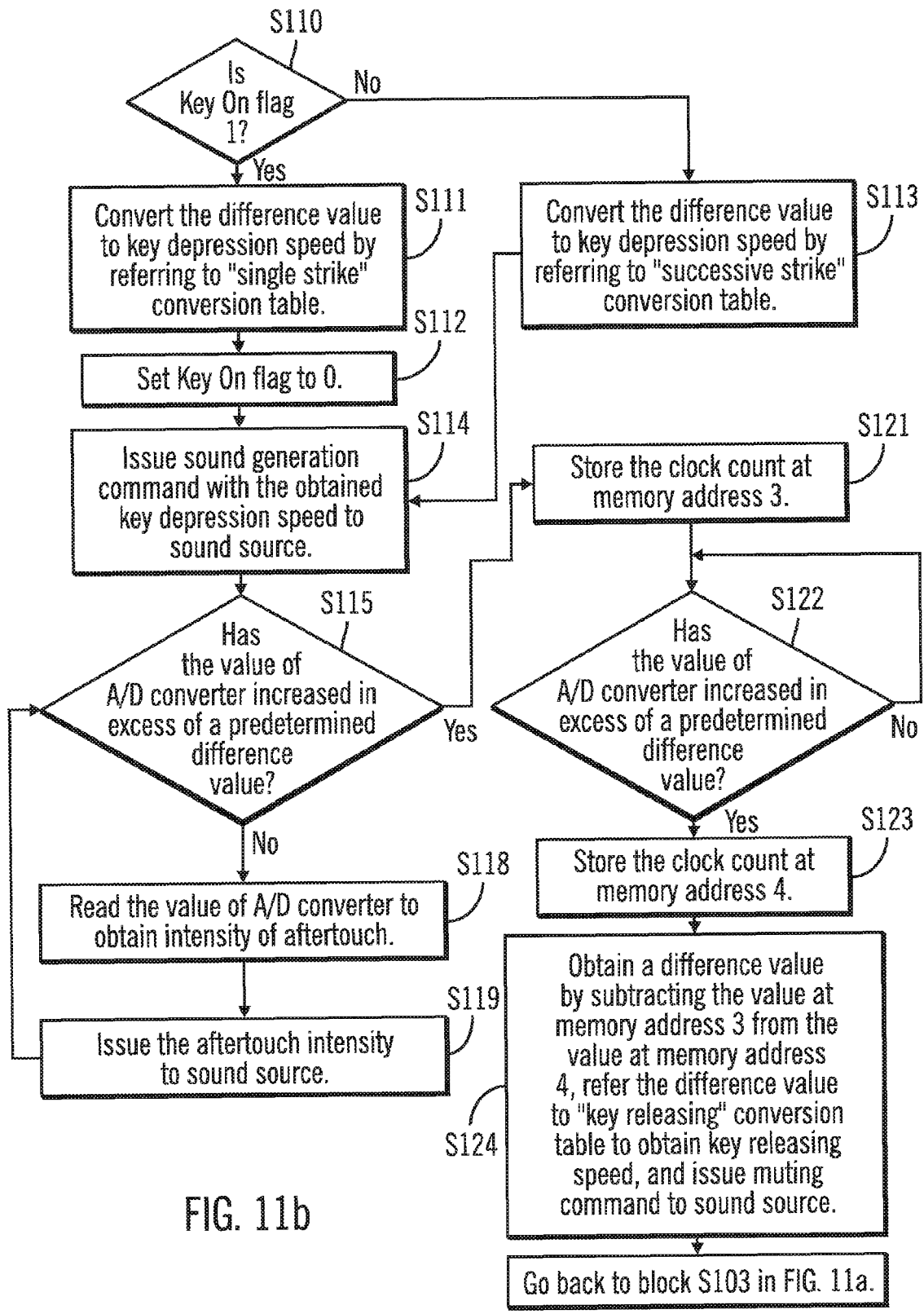
Figure 12:
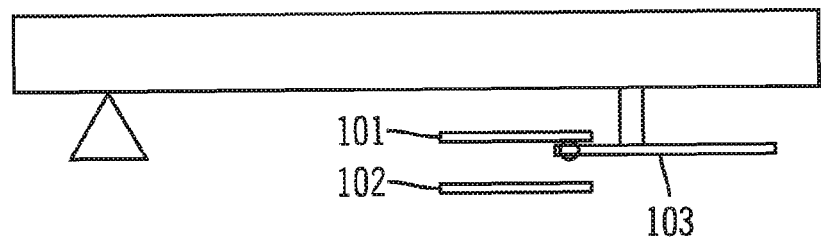
FIG. 12 shows a key switch in an electronic musical instrument in related art.
Figure 13:
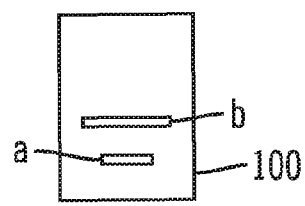
FIG. 13 is a shutter in an electronic musical instrument in related art.
Figure 14:
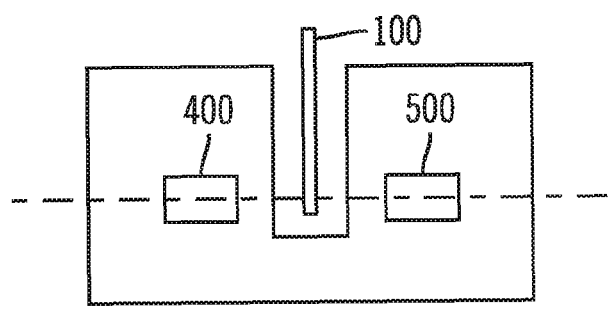
FIG. 14 is a view showing the relation between the shutter of FIG. 13, a light emitting element and a photodetecting element.
Figure 15:
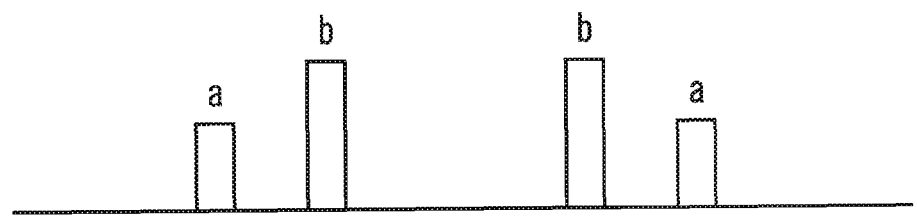
FIG. 15 is a diagram showing changes in the amount of light detected by the photodetecting element of FIG. 14.
Figure 16:
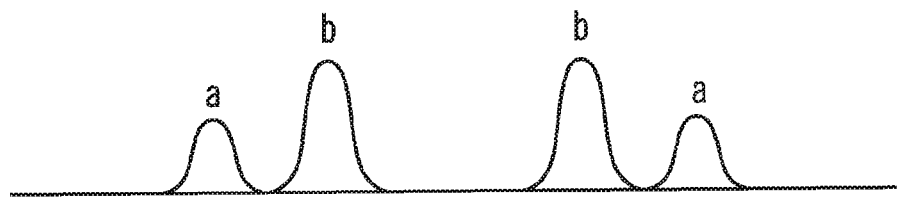
FIG. 16 is a diagram showing changes in the amount of light detected by the photodetecting element of FIG. 14.
Figure 17:
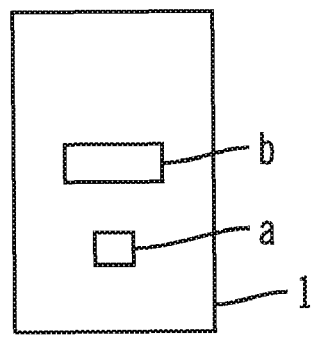
FIG. 17 is a view in enlargement of the shutter of FIG. 13.
Figure 18:
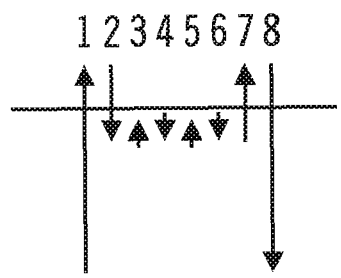
FIG. 18 shows movements of the photodetecting element that moves relatively to the shutter of FIG. 14.
Figure 19:
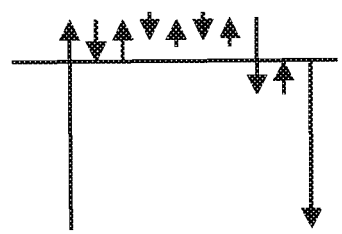
FIG. 19 shows movements of the photodetecting element that moves relatively to the shutter of FIG. 14.
Figure 20:
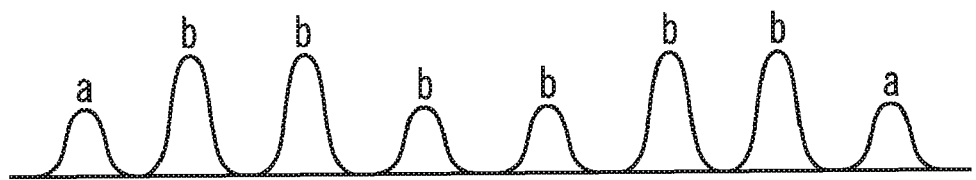
FIG. 20 shows changes in the amount of light corresponding to the movements of the photodetecting element of FIG. 18.

It is noted that, in the processing shown in FIGS. 11a and 11b, when the light flux moves over the boundary between the zone c and the zone b of the transmission film of the shutter and enters the zone b, a muting command is issued to the sound source based on the key releasing speed corresponding to the passing speed of the light flux in the zone c. However, after the muting command has been issued, a command for the musical note that is being muted is not issued. Instead, when the light flux moves over the boundary between the zone c and the zone b of the transmission film of the shutter and enters the zone b, a muting speed command may be issued to the sound source according to an output value of the A/D converter 10, in other words, a key depression position. In this case, when the light flux is within the zone b, the sound may be muted at a higher rate as the key depression position becomes shallower, and when the light flux moves over the boundary between the zone b and the zone a and enters the zone a, the sound may be muted at a maximum rate. In an acoustic piano, when a key that is being pressed down returns, an associated dumper starts contacting the strings as the key depression position becomes shallower to a certain depth, whereby attenuation of vibration of the strings is accelerated. As the key depression position becomes shallower further, the contact pressure of the dumper against the strings increases and the attenuation rate is further accelerated. Such a behavior of the acoustic piano can be simulated by the processing described above. In this case, the muting speed command may be issued to the sound source as a control change of the characteristics of MIDI, or as an individual aftertouch.

When the shutter whose transparency repeatedly changes in a sawtooth profile, the key depression position can be continuously detected in each of the zones where the transparency continuously changes with respect to a key depression depth. Also, because the transparency rapidly changes with respect to a key depression depth at the boundary between adjacent ones of the zones whose transparency continuously changes, in a direction opposite to the transparency changing direction in each of the zones, the transition of the boundary between the zones can also be accurately detected. For this reason, by matching each of the boundaries with each of specific key depression depths, detection of the timings at which the key depression depth reaches the specific depths would become difficult to be influenced by differences in the amount of light of the light emitting element 4 and the sensitivity of the photodetecting element 5. As a result, the key depression speed and the key releasing speed can be accurately obtained, and changes in the key depth during a key depression process and changes in the key depth during a key releasing process after the sound has been generated can be rapidly detected.

With the shutter whose transparency repeatedly changes in a sawtooth profile, the amount of darkest light to the amount of brightest light can be used in full range in each of the zones where the transparency continuously changes, which can provide a greater dynamic range, compared to a shutter with a full key depression depth range being made to correspond to the amount of darkest light to the amount of brightest light. Therefore, the amount of shift of a key can be accurately, continuously measured even in a minute zone segment, and continuous changes with the lapse of time, such as, the aftertouch and its shifting directions can be detected with good precision. Moreover, a greater change in the amount of light is available at each boundary between adjacent ones of the zones, each having a continuously changing transparency, such that the boundary can be more readily detected.

It is noted that, instead of the shutter shown in FIG. 7, the shutter shown in FIG. 6 in which the amount of light changes stepwise, in other words, changes generally continuously, in each of the zones may be used. In both of the systems, the entire range of the shutter is divided into smaller zones of appropriate size, the amount of light changes continuously or stepwise in each of the smaller zones, and a notch can be set at each boundary between adjacent ones of the smaller zones at which the amount of light abruptly and discretely changes, whereby the accuracy in detection can be improved. The invention is very effective when applied to keys of a keyboard, in particular, each having a zone where detection of a key depression speed in each key depression stroke is very important, and detection of minute changes in the key depression speed at both ends of the zone is very important.

In the embodiment described above, an example of obtaining a key depression position of a single key is shown. However, processing for light emission, light reception, detection and the like may be obtained by processing them by a time division method. It is noted that the processing by a time division method may be generally known, and therefore its description is omitted. It is noted that, when the shutter with stepwise transparency gradation shown in FIG. 5 is used, the levels to be discriminated can be relatively rough, such that, as the A/D converter for converting currents of the photodetecting element, those with a relatively low resolution but with a high operation speed may be used. Accordingly, the invention is characterized in that outputs of many photodetecting elements can be readily measured by a time division method with a single A/C converter.

In the embodiment described above, a light emitting element and a photodetecting element are opposed one-to-one to each other. However light from a single light emitting element may be optically distributed and may be shared by a plurality of keys. Also, in the embodiment described above, the shutter is directly attached to the key. However, the shutter may be attached to a hammer driven by the key or a lever linked with the key.

Furthermore, in the embodiment described above, the shutter that controls the amount of transmitting light according to the key depression depth is provided in the optical path between the light emitting element and the photodetecting element. However a reflection member that controls the amount of light reflection according to the key depression depth may be provided in the optical path between the light emitting element and the photodetecting element. Moreover, in the embodiment described above, the shutter is disposed directly between the light emitting element and the photodetecting element. However, an optical fiber may be inserted in the optical path between the light emitting element and the photodetecting element. For example, light from the light emitting element may be guided through the optical fiber to the shutter or the reflection member, and light from the shutter or the reflection member may be guided through the optical fiber to the photodetecting element.

Furthermore, the change characteristics of the amount of transmission or the amount of reflection with respect to changes in the key depression depth may be in reverse with respect to those of the embodiment described above.

In accordance with the embodiment described above, the microprocessor that is connected through the D/A converter to the light emitting element controls the current flowing through the light emitting element, whereby deviations in light emitting elements and photodetecting elements caused by individual specificities and temperature changes may be corrected. In the shutters shown in the embodiments described above, the transmittance is at the lowest level when the key is not depressed. However, the change characteristic of transparency of the shutter with respect to changes in a key depression depth may be in reverse with respect to that of the embodiment described above, wherein the transmittance is set at the highest level when the key is not depressed. In this case, the amount of light of the light emitting element and the sensitivity of the photodetecting element can be measured and adjusted in a key depression standby period. Furthermore, for power saving on current flowing through the light emitting element and longer serviceable life thereof, in addition to the time-division emission, the current of the light emitting element may be suppressed in the key depression standby period, and the current of the light emitting element may be returned to a level for the regular amount of emission when the A/D converter 10 detects even a slightest change; and the current of the light emitting element may be suppressed to a sleep mode when the key is not played for a predetermined period of time or longer.

In the embodiments described above, keys of a keyboard are described as operation members that are subject to detection of their operation positions, but the invention is also applicable to other operation members, such as, pedals, levers and the like, in addition to the keys.

What is claimed is:

1. An operation position sensor device for an electronic musical instrument, comprising:
    an operation member;
    a light emitting section;
    a photodetecting section;
    a light amount controlling member that is placed in an optical path between the light emitting section and the photodetecting section, wherein the light amount controlling member includes a transmission film having a plurality of zones formed in the transmission film, wherein the zones provide different transparencies that change as an operation position of the operation member changes, wherein the zones provide a plurality of transparencies that emit light, and wherein the transmission film controls the amount of light inputted from the light emitting section to the photodetecting section according to the operation position of the operation member; and
    an operation position sensor section that detects the operation position of the operation member based on the amount of light received by the photodetecting section, determines that the operation position of the operation member has shifted from one of operation position zones to adjacent one of the operation position zones when the amount of light detected by the photodetecting section changes, and determines to which one of adjacent ones of operation position zones the operation position has shifted from the one of operation position zones depending on whether the amount of light has increased or decreased.

2. The operation position sensor device of claim 1, further comprising:
    an operation speed sensor device that detects an operation speed of the operation member by measuring with the operation position sensor section an elapsed time in which the operation position of the operation member passes a predetermined operation position zone.

3. The operation position sensor device of claim 1, further comprising:
    a lens having a focal point on the light amount controlling member in front of the light emitting element.

4. The operation position sensor device of claim 1, further comprising:
    a lens having a focal point on the light amount controlling member in front of the photodetecting section.

5. An operation position sensor device for an electronic musical instrument, comprising:
    an operation member;
    a light emitting section;
    a photodetecting section;
    a light amount controlling member that is placed in an optical path between the light emitting section and the photodetecting section, and controls the amount of light inputted from the light emitting section to the photodetecting section according to an operation position of the operation member; and
    an operation position sensor section that detects the operation position of the operation member based on the amount of light received by the photodetecting section,
    wherein the amount of light to be controlled by the light amount controlling member continuously changes in a first direction when the operation position is within at least one predetermined operation position zone, corresponding to changes in a predetermined direction of the operation position of the operation member, and discretely changes in a second direction opposite to the first direction when the operation position moves from outside of the predetermined operation position zone to the predetermined operation position zone or the operation position moves from the predetermined operation position zone to outside of the predetermined operation position zone; and
    wherein the operation position sensor section judges, when the amount of light detected by the photodetecting section changes more than a predetermined value, that the operation position of the operation member has moved from outside the predetermined operation position zone to the predetermined operation position zone or the operation position has moved from the predetermined operation position zone to outside the predetermined operation position zone.

6. The operation position sensor device of claim 5, further comprising an operation speed sensor device that detects an operation speed of the operation member by measuring with the operation position sensor section an elapsed time in which the operation position of the operation member passes a predetermined operation position zone.

7. The operation position sensor device of claim 5, wherein the operation position sensor section detects an operation position of the operation member within the predetermined operation position zone when the amount of light detected by the photodetecting section does not change in excess of the predetermined value.

8. The operation sensor device of claim 5, further comprising:
    a lens having a focal point on the light amount controlling member in front of the light emitting element.

9. The operations sensor device of claim 5, further comprising:
    a lens having a focal point on the light amount controlling member in front of the photodetecting section.

10. A method for detecting an operation position of an operation member in an electronic musical instrument, comprising:
    determining that an amount of measured light resulting from a depression of the operation member has changed in excess of a predetermined difference value a number of times;
    determining a difference value of clock counts measured at a last two determinations that the measured light changed in excess of the predetermined difference value in response to determining that the amount of the measured light has changed in excess of the predetermined difference value the number of times;
    converting the difference value to a key depression speed; and issuing a sound generation command based on the key depression speed to a sound source.

11. The method of claim 10, wherein the determination of whether the measured amount of light has changed in excess of the predetermined difference value comprises determining whether the measured amount of light has increased in excess of the predetermined difference value.

12. The method of claim 11, wherein the measured light changes occur in a stepwise gradation including at least three steps, each step indicating an increasing amount of light over a previous step, wherein the number of times corresponds to a number of the steps.

13. The method of claim 10, wherein the determination of whether the measured amount of light has changed in excess of the predetermined difference value comprises determining whether the measured amount of light has decreased in excess of the predetermined difference value.

14. The method of claim 13, wherein the measured light changes occur in a saw tooth gradation including at least three gradations, and wherein the number of times corresponds to the number of gradations.

15. A method for detecting an operation position of an operation member in an electronic musical instrument, comprising:
determining that an amount of measured light resulting from a depression of the operation member has changed in excess of a predetermined difference value a number of times;
determining a difference value of clock counts measured at a last two determinations that the measured light changed in excess of the predetermined difference value in response to determining that the amount of the measured light has changed in excess of the predetermined difference value the number of times;
determining whether the depression of the operation member belongs to successive strikes or a single strike of the operation member;
using a single strike conversion table to convert the difference value to a key depression speed in response to determining that the depression of the operation member belongs to the single strike;
using a successive strike conversion table to convert the difference value to the key depression speed in response to determining that the depression of the operation member belongs to the successive strike; and
issuing a sound generation command based on the key depression speed to a sound source.

16. A method for detecting an operation position of an operation member in an electronic musical instrument, comprising:
determining that an amount of measured light resulting from a depression of the operation member has changed in a first direction in excess of a predetermined difference value a first number of times;
determining a difference value of clock counts measured at a last two determinations that the measured light changed in excess of the predetermined difference value in response to determining that the amount of the measured light has changed in excess of the predetermined difference value the first number of times;
converting the difference value to a key depression speed;
issuing a sound generation command based on the key depression speed to a sound source;
determining that an amount of measured light resulting from the depression of the operation member has changed in a second direction in excess of the predetermined difference value a second number of times following issuing the sound generation command, wherein the second direction is opposite of the first direction;
determining a second difference value of clock counts measured at a last two determinations that the measured light changed in excess of the predetermined difference value in response to determining that the amount of the measured light has changed in the second direction in excess of the predetermined difference value the second number of times;
converting the second difference value to a key releasing speed; and
issuing a muting command to the sound source based on the key releasing speed.

17. The method of claim 16, wherein the determining that the measured light has changed in the first direction in excess of the predetermined difference value comprises one of determining that the measured light has increased in excess of the predetermined difference value or determining that the measured light has decreased in excess of the predetermined difference value.

18. The method of claim 16, wherein the determining that the measured light has changed in the first direction in excess of the predetermined difference value comprises determining that the measured light has increased in excess of the predetermined difference value and determining that the measured light has changed in the second direction in excess of the predetermined difference value comprises determining that the measured light has increased in excess of the predetermined difference value, further comprising:
determining that the amount of measured light resulting from the depression of the operation member has increased in excess of the predetermined difference value following the issuing of the sound generation command; and
issuing an aftertouch intensity to the sound source.

19. An electronic musical instrument, comprising:
an operation member;
a light emitting section;
a photodetecting section;
a light amount controlling member that is placed in an optical path between the light emitting section and the photodetecting section, and controls the amount of light inputted from the light emitting element to the photodetecting section according to an operation position of the operation member; and
a processing component that performs operations, the operations comprising:
determining that an amount of measured light resulting from the depression of the operation member, received from the photodetecting section, has changed in excess of a predetermined difference value a number of times;
determining a difference value of clock counts measured at a last two determinations that the measured light changed in excess of the predetermined difference value in response to determining that the amount of the measured light has changed in excess of the predetermined difference value the number of times;
converting the difference value to a key depression speed; and
issuing a sound generation command based on the key depression speed to a sound source.

20. The electronic musical instrument of claim 19, wherein the determination of whether the measured amount of light has changed in excess of the predetermined difference value comprises determining whether the measured amount of light has increased in excess of the predetermined difference value.

21. The electronic musical instrument of claim 20, wherein the measured light changes occur in a stepwise gradation including at least three steps, each step indicating an increasing amount of light over a previous step, wherein the number of times corresponds to a number of the steps.

22. The electronic musical instrument of claim 19, wherein the determination of whether the measured amount of light has changed in excess of the predetermined difference value comprises determining whether the measured amount of light has decreased in excess of the predetermined difference value.

23. The electronic musical instrument of claim 22, wherein the measured light changes occur in a saw tooth gradation including at least three gradations, and wherein the number of times corresponds to the number of gradations.

24. An electronic musical instrument, comprising:
an operation member;
a light emitting section;
a photodetecting section;
a light amount controlling member that is placed in an optical path between the light emitting section and the photodetecting section, and controls the amount of light inputted from the light emitting element to the photodetecting section according to an operation position of the operation member; and
a processing component that performs operations, the operations comprising:
determining that an amount of measured light resulting from a depression of the operation member, received from the photodetecting section, has changed in excess of a predetermined difference value a number of times;
determining a difference value of clock counts measured at a last two determinations that the measured light changed in excess of the predetermined difference value in response to determining that the amount of the measured light has changed in excess of the predetermined difference value the number of times;
determining whether the depression of the operation member belongs to successive strikes or a single strike of the operation member;
using a single strike conversion table to convert the difference value to a key depression speed in response to determining that the depression of the operation member belongs to the single strike;
using a successive strike conversion table to convert the difference value to the key depression speed in response to determining that the depression of the operation member belongs to the successive strike; and
issuing a sound generation command based on the key depression speed to a sound source.

25. An electronic musical instrument, comprising:
an operation member;
a light emitting section;
a photodetecting section;
a light amount controlling member that is placed in an optical path between the light emitting section and the photodetecting section, and controls the amount of light inputted from the light emitting element to the photodetecting section according to an operation position of the operation member; and
a processing component that performs operations, the operations comprising:
determining that an amount of measured light resulting from a depression of the operation member has changed in a first direction in excess of a predetermined difference value a first number times;
determining a difference value of clock counts measured at a last two determinations that the measured light changed in excess of the predetermined difference value in response to determining that the amount of the measured light has changed in excess of the predetermined difference value the first number of times;
converting the difference value to a key depression speed;
issuing a sound generation command based on the key depression speed to a sound source;
determining that an amount of measured light resulting from the depression of the operation member has changed in a second direction in excess of the predetermined difference value a second number of times following issuing the sound generation command, wherein the second direction is opposite of the first direction;
determining a second difference value of clock counts measured at a last two determinations that the measured light changed in excess of the predetermined difference value in response to determining that the amount of the measured light has changed in the second direction in excess of the predetermined difference value the second number of times;
converting the second difference value to a key releasing speed; and
issuing a muting command to the sound source based on the key releasing speed.

26. The electronic musical instrument of claim 25, wherein the determining that the measured light has changed in the first direction in excess of the predetermined difference value comprises one of determining that the measured light has increased in excess of the predetermined difference value or determining that the measured light has decreased in excess of the predetermined difference value.

27. The electronic musical instrument of claim 25, wherein the determining that the measured light has changed in the first direction in excess of the predetermined difference value comprises determining that the measured light has increased in excess of the predetermined value and determining that the measured light has changed in the second direction in excess of the predetermined difference value comprises determining that the measured light has increased in excess of the predetermined difference value, further comprising:
determining that the amount of measured light resulting from the depression of the operation member has increased in excess of the predetermined difference value following the issuing of the sound generation command; and
issuing an aftertouch intensity to the sound source.

28. The electronic musical instrument of claim 19, wherein the electronic musical instrument comprises an electronic keyboard and the operation member comprises a keyboard key.

29. The operation position sensor device of claim 1, wherein the transparencies change stepwise between the zones.

30. The operation position sensor device of claim 1, wherein the transparencies change stepwise within the zones.

31. The operation position sensor device of claim 1, wherein the transparencies change continuously.

32. The operation position sensor device of claim 31, wherein the transparencies continually increase within the zones and abruptly attenuate at boundaries of adjacent zones.

* * * * *